United States Patent
Pourreza Shahri et al.

(10) Patent No.: US 10,841,549 B2
(45) Date of Patent: Nov. 17, 2020

(54) METHODS AND APPARATUS TO FACILITATE ENHANCING THE QUALITY OF VIDEO

(71) Applicant: QUALCOMM Incorporated, San Diego, CA (US)

(72) Inventors: Reza Pourreza Shahri, San Diego, CA (US); Amirhossein Habibian, Amsterdam (NL); Taco Sebastiaan Cohen, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/824,043

(22) Filed: Mar. 19, 2020

(65) Prior Publication Data
US 2020/0304766 A1 Sep. 24, 2020

Related U.S. Application Data

(60) Provisional application No. 62/822,599, filed on Mar. 22, 2019.

(51) Int. Cl.
| | | |
|---|---|---|
| H04N 5/21 | (2006.01) | |
| H04N 9/64 | (2006.01) | |
| G06T 5/00 | (2006.01) | |
| G06T 3/00 | (2006.01) | |
| H04N 9/79 | (2006.01) | |

(52) U.S. Cl.
CPC .......... *H04N 9/646* (2013.01); *G06T 3/0093* (2013.01); *G06T 5/002* (2013.01); *H04N 9/7908* (2013.01)

(58) Field of Classification Search
CPC .......... H04N 5/21; H04N 5/213; H04N 9/646; H04N 9/7908; G06T 3/0093; G06T 5/001; G06T 5/002; G06T 5/20
USPC ........ 348/607, 624, 625, 630; 382/254, 266, 382/275
See application file for complete search history.

(56) References Cited

U.S. PATENT DOCUMENTS

2014/0037222 A1* 2/2014 Choudhury ........... G06T 7/0004
382/235

* cited by examiner

*Primary Examiner* — Sherrie Hsia
(74) *Attorney, Agent, or Firm* — Arent Fox, LLP (57) ABSTRACT

The present disclosure relates to methods and devices for facilitating enhancing the quality of video. An example method disclosed herein includes estimating an optical flow between a first noisy frame and a second noisy frame, the second noisy frame following the first noisy frame. The example method also includes warping a first enhanced frame to align with the second noisy frame, the warping being based on the estimation of the optical flow between the first noisy frame and the second noisy frame, the first enhanced frame being an enhanced frame of the first noisy frame. The example method also includes generating a second enhanced frame based on the warped first enhanced frame and the second noisy frame, and outputting the second enhanced frame.

30 Claims, 3 Drawing Sheets

METHODS AND APPARATUS TO FACILITATE ENHANCING THE QUALITY OF VIDEO

CROSS REFERENCE TO RELATED APPLICATION(S)

This application claims the benefit of U.S. Provisional Application Ser. No. 62/822,599, entitled "METHODS AND APPARATUS TO FACILITATE ENHANCING THE QUALITY OF VIDEO" and filed on Mar. 22, 2019, which is expressly incorporated by reference herein in its entirety.

TECHNICAL FIELD

The present disclosure relates generally to processing systems and, more particularly, to one or more techniques for facilitating enhancing the quality of video.

INTRODUCTION

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of the disclosure, a method, a computer-readable medium, and an apparatus are provided. In one example, an apparatus may estimate an optical flow between a first noisy frame and a second noisy frame. The second noisy frame may follow the first noisy frame. The apparatus may also warp a first enhanced frame to align with the second noisy frame. The apparatus may perform the warping based on the estimation of the optical flow between the first noisy frame and the second noisy frame. The first enhanced frame may be an enhanced frame of the first noisy frame. The apparatus may further generate a second enhanced frame based on the warped first enhanced frame and the second noisy frame. Additionally, the apparatus may output the second enhanced frame. In some examples, the first and second noisy frames are decoded frames.

The details of one or more examples of the disclosure are set forth in the accompanying drawings and the description below. Other features, objects, and advantages of the disclosure will be apparent from the description and drawings, and from the claims.

DETAILED DESCRIPTION

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like, which can be collectively referred to as "elements." These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors, which may also be referred to as processing units. Examples of processors include image signal processors (ISPs), central processing units (CPUs), graphics processing units (GPUs), image processors, video processors, microprocessors, microcontrollers, application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (e.g., software) being configured to perform one or more functions. In such examples, the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and executed the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can be a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium" and "computer-readable memory" are used interchangeably.

Compressed content typically suffers from some level of quality degradation due to information loss during lossy compression of the content. Frame-by-frame enhancement techniques may be used to enhance the quality of content in a frame-by-frame manner. However, by processing one frame at a time, frame-by-frame enhancement techniques disregard the temporal correlation between the frames. Multi-frame enhancement techniques may be used to enhance the quality of a batch of frames and generate an enhanced frame that corresponds to a center frame of the batch of frames. While multi-frame enhancement techniques may improve quality over frame-by-frame enhancement techniques, they also introduce computational redundancies due to the overlap of frames in subsequent batches. Multi-frame enhancement also typically have no or limited temporal memory as the temporal information is limited to the frames of the batch of frames being processed.

In general, this disclosure describes techniques for utilizing spatial information and temporal information for facilitating video quality enhancement. Furthermore, the techniques disclosed herein may be computationally efficient as they can process one frame at a time (e.g., the previous frame is used for optical flow estimation). Additionally, the feedback from the output of one iteration may enable the techniques disclosed herein to have increased temporal memory about past frames compared to multi-frame approaches that have no temporal memory and/or have limited temporal memory. The feedback also may enable a consistent output frame sequence. For example, the enhancements applied to the previous frame may be used while processing the current frame. The reuse of information may reduce the likelihood of flicker in the enhanced video. The techniques disclosed herein may allow for a higher degree of compression than would otherwise be able to be compensated for, which may reduce transmission costs and/or storage costs associated with compressed data. Other example benefits are described throughout this disclosure.

As used herein, the term "coder" may generically refer to an encoder and/or decoder. For example, reference to a "content coder" may include reference to a content encoder and/or a content decoder. Similarly, as used herein, the term "coding" may generically refer to encoding and/or decoding. As used herein, the terms "encode" and "compress" may be used interchangeably. Similarly, the terms "decode" and "decompress" may be used interchangeably.

As used herein, instances of the term "content" may refer to the term "video," "graphical content," "image," and vice versa. This is true regardless of whether the terms are being used as an adjective, noun, or other parts of speech. For example, reference to a "content coder" may include reference to a "video coder," a "graphical content coder," or an "image coder," and reference to a "video coder," a "graphical content coder," or an "image coder" may include reference to a "content coder." As another example, reference to a processing unit providing content to a content coder may include reference to the processing unit providing graphical content to a video encoder. In some examples, as used herein, the term "graphical content" may refer to a content produced by one or more processes of a graphics processing pipeline. In some examples, as used herein, the term "graphical content" may refer to content produced by a processing unit configured to perform graphics processing. In some examples, as used herein, the term "graphical content" may refer to content produced by a graphics processing unit.

As used herein, instances of the term "content" may refer to graphical content, video content, or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a "framebuffer"). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (e.g., the frame includes two or more layers, and the frame that includes two or more layers may subsequently be blended).

As referenced herein, a first component (e.g., a processing unit) may provide content to a second component (e.g., a content coder). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

Figure 1:
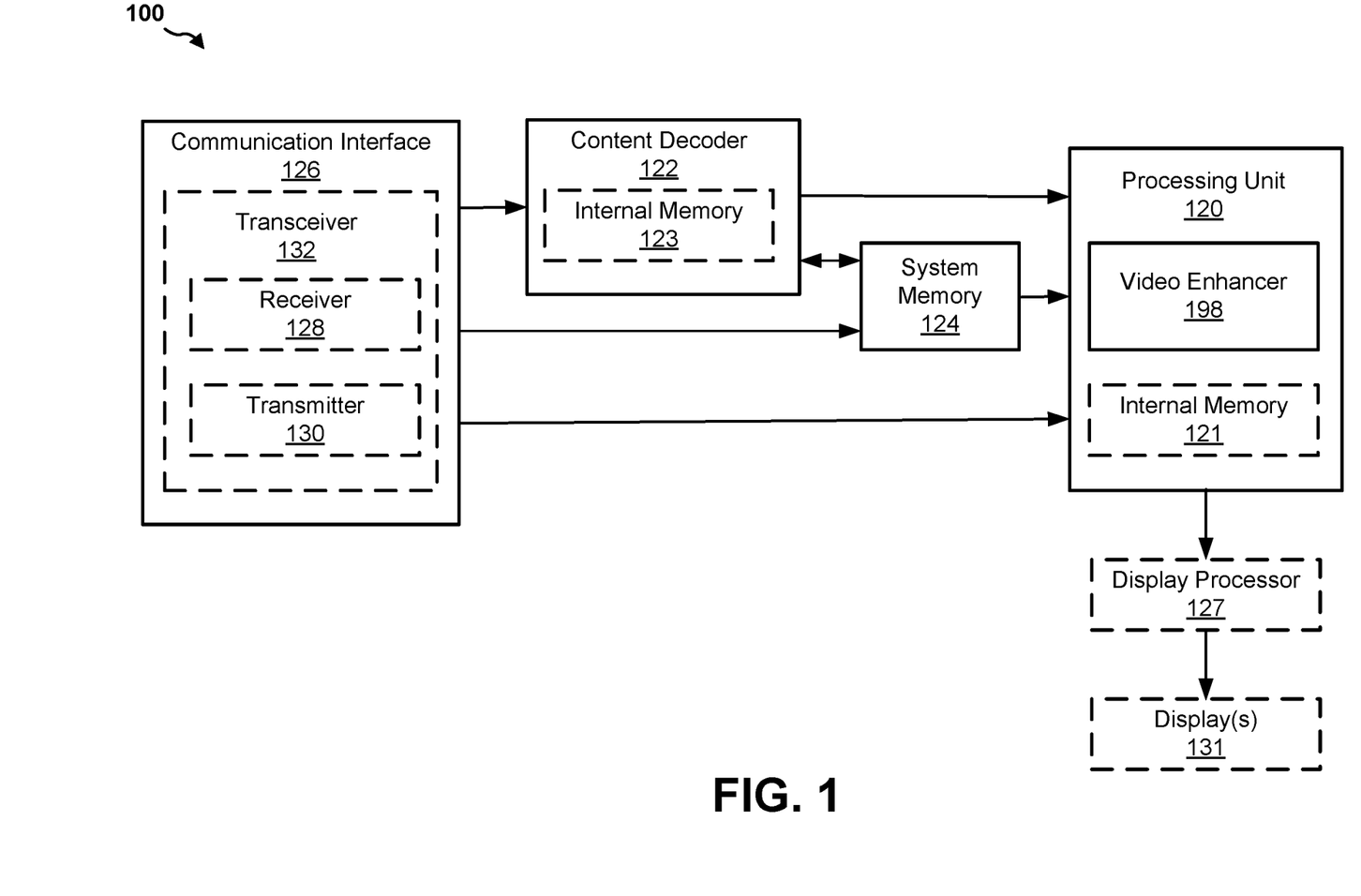
FIG. 1 is a block diagram that illustrates an example system in accordance with the techniques of this disclosure.

FIG. 1 is a block diagram that illustrates an example device 100 configured to implement one or more techniques of this disclosure. In accordance with the techniques described herein, the device 100 may include one or more components (or circuits) for performing various functions described herein. In some examples, one or more components of the device 100 may be components of an SoC.

The device 100 may include one or more components configured to perform one or more techniques of this disclosure. In the example shown in FIG. 1, the device 100 may include a processing unit 120, a content decoder 122, a system memory 124, a communication interface 126, and one or more displays 131. Reference to the display 131 may refer to the one or more displays 131. For example, the display 131 may include a single display or a plurality of displays. The display 131 may include a first display and a second display. The first display may be a left-eye display and the second display may be a right-eye display. In some examples, the first display and the second display may receive different frames for presentment thereon. In other examples, the first display and the second display may receive the same frames for presentment thereon.

The processing unit 120 may include an internal memory 121. The processing unit 120 may be configured to perform video or graphics processing, such as in a graphics processing pipeline. The content decoder 122 may include an internal memory 123. In some examples, the device 100 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display content that was generated using decoded content. For example, the display processor 127 may be configured to process one or more frames generated by the processing unit 120, where the one or more frames are generated by the processing unit 120 by using decoded content that was derived from encoded content (e.g., received from a source device). In turn, the display processor 127 may be configured to perform display processing on the one or more frames generated by the processing unit 120. The one or more displays 131 may be configured to display or otherwise present frames processed by the display processor 127. In some examples, the one or more display devices may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content decoder 122, such as system memory 124, may be accessible to the processing unit 120 and the content decoder 122. For example, the processing unit 120 and the content decoder 122 may be configured to read from and/or write to external memory, such as the system memory 124. The processing unit 120 and the content decoder 122 may be communicatively coupled to the system memory 124 over a bus. In some examples, the processing unit 120 and the content decoder 122 may be communicatively coupled to each other over the bus or a different connection.

The content decoder 122 may be configured to receive content from any source, such as the system memory 124 and/or the communication interface 126. The system memory 124 may be configured to store received encoded content, such as encoded content received from a content source. The content decoder 122 may be configured to receive encoded content (e.g., from the system memory 124 and/or the communication interface 126) in the form of encoded pixel data, such as a bitstream. The content decoder 122 may be configured to decode encoded content.

The internal memory 121, the system memory 124, and/or the internal memory 123 may include one or more volatile or non-volatile memories or storage devices. In some examples, internal memory 121, the system memory 124, and/or the internal memory 123 may include RAM, SRAM, DRAM, erasable programmable ROM (EPROM), electrically erasable programmable ROM (EEPROM), Flash memory, a magnetic data media or an optical storage media, or any other type of memory.

The internal memory 121, the system memory 124, and/or the internal memory 123 may be a non-transitory storage medium according to some examples. The term "non-transitory" may indicate that the storage medium is not embodied in a carrier wave or a propagated signal. However, the term "non-transitory" should not be interpreted to mean that internal memory 121, the system memory 124, and/or the internal memory 123 is non-movable or that its contents are static. As one example, the system memory 124 may be removed from the device 100 and moved to another device. As another example, the system memory 124 may not be removable from the device 100.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 100. In some examples, the processing unit 120 may be present on a graphics card that is installed in a port in a motherboard of the device 100, or may be otherwise incorporated within a peripheral device configured to interoperate with the device 100.

The processing unit 120 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium (e.g., internal memory 121), and may execute the instructions in hardware using one or more processors to perform the techniques of this disclosure. It should be appreciated that any of the foregoing (including hardware, software, a combination of hardware and software, etc.) may be considered to be one or more processors.

The content decoder 122 may be any processing unit configured to perform content decoding. In some examples, the content decoder 122 may be integrated into a motherboard of the device 100. The content decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content decoder 122 may store instructions for the software in a suitable, non-transitory computer-readable storage medium (e.g., internal memory 123), and may execute the instructions in hardware using one or more processors to perform the techniques of this disclosure. It should be appreciated that any of the foregoing (including hardware, software, a combination of hardware and software, etc.) may be considered to be one or more processors.

The communication interface 126 may include a receiver 128 and a transmitter 130.

The receiver 128 may be configured to perform any receiving function described herein with respect to the device 100. For example, the receiver 128 may be configured to receive information from a content source, which may include coded content, such as encoded content. As another example, the receiver 128 may be configured to receive position information from the device 100, which may be encoded or unencoded (e.g., not encoded). In some examples, the device 100 may be configured to decode encoded content received from the content source in accordance with the techniques described herein. For example, the content decoder 122 may be configured to decode encoded content to produce or otherwise generate decoded content. The processing unit 120 may be configured to use the decoded content to produce or otherwise generate one or more frames for presentment on the one or more displays 131. The transmitter 130 may be configured to perform any transmitting function described herein with respect to the device 100. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 100.

The content decoder 122 of the device 100 represents an example of a computing component (e.g., a processing unit) that may be configured to perform one or more techniques for decoding content in accordance with various examples described in this disclosure. In some examples, the content decoder 122 may be configured to operate in accordance with a content coding standard, such as a video coding standard, a display stream compression standard, or an image compression standard.

As shown in FIG. 1, the device 100 may be configured to decode encoded content obtained from a content source. Accordingly, the device 100 may be referred to as a content decoding device or a content decoding apparatus.

Referring again to FIG. 1, in certain aspects, the processing unit 120 may include a video enhancer 198 configured to enhance the quality of videos by, for example, reducing compression artifacts and/or adding texture to the video. In some embodiments, the video enhancer 198 can be a hardware component of the processing unit 120 and/or a software component executable by the processing unit 120. The video enhancer 198 may be configured to estimate an optical flow between a first noisy frame and a second noisy frame. A noisy frame may be a frame which resulted from encoding and decoding or compressing and decompressing an original frame, and that includes artifacts, loss of high frequency content (e.g., corresponding to fine textures), or other inconsistencies with the original frame as a result of the encoding and decoding or compression and decompression. The second noisy frame may follow the first noisy frame. In some examples, the first and second noisy frames are decoded frames. In some examples, the first and second noisy frames are decoded frames of compressed content. For example, the content decoder 122 may decode encoded content to generate the first and second noisy frames, and the content decoder 122 may provide the first and second noisy frames to the video enhancer 198. The video enhancer 198 may also warp a first enhanced frame to align with the second noisy frame. The video enhancer 198 may perform the warping based on the estimation of the optical flow between the first noisy frame and the second noisy frame. The first enhanced frame may be an enhanced frame of the first noisy frame. The video enhancer 198 may further generate a second enhanced frame based on the warped first enhanced frame and the second noisy frame. Additionally, the video enhancer 198 may output the second enhanced frame.

By using a recurrent structure (e.g., a structure in which a previously enhanced frame is fed back and used to enhance a subsequent frame) to process the frames of the video, the device 100 may be able to, in some examples, utilize spatial information and temporal information for facilitating video quality enhancement. Furthermore, the device 100 may be computationally efficient as it processes one frame at a time (e.g., the current frame is processed and the previous frame is used for optical flow estimation). Additionally, the feedback from the output (e.g., the second enhanced frame) may enable the device 100 to have increased temporal memory about past frames compared to multi-frame approaches that have no temporal memory and/or have limited temporal memory. The feedback also may enable an output frame sequence with improved consistency. For example, the enhancements applied to the previous frame (e.g., the first enhanced frame) may be used while processing the current frame (e.g., the second decoded frame). The reuse of information may reduce the likelihood of flicker in the enhanced video. Other example benefits are described throughout this disclosure.

As described herein, a device, such as the device 100, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality device, or a virtual reality device), a non-wearable device, an augmented reality device, a virtual reality device, a display (e.g., display device), a television, a television set-top box, an intermediate network device, a digital media player, a video streaming device, a content streaming device, an in-car computer, any mobile device, any device configured to generate content, or any device configured to perform one or more techniques described herein.

The device 100 may be configured to communicate with another device, such as a content source. For example, the device 100 may be configured to receive encoded content from a content source.

Devices described herein may be configured to communicate with each other, such as the device 100 and a content source. Communication may include the transmission and/or reception of information. The information may be carried in one or more messages. As an example, a first device in communication with a second device may be described as being communicatively coupled to the second device. For example, a client device and a server may be communicatively coupled. As another example, a server may be communicatively coupled to a plurality of client devices. As another example, any device described herein configured to perform one or more techniques of this disclosure may be communicatively coupled to one or more other devices configured to perform one or more techniques of this disclosure. In some examples, when communicatively coupled, two devices may be actively transmitting or receiving information, or may be configured to transmit or receive information. If not communicatively coupled, any two devices may be configured to communicatively couple with each other, such as in accordance with one or more communication protocols compliant with one or more communication standards. Reference to "any two devices" does not mean that only two devices may be configured to communicatively couple with each other; rather, any two devices is inclusive of more than two devices. For example, a first device may be communicatively coupled with a second device and the first device may be communicatively coupled with a third device. In such an example, the first device may be a server.

With reference to FIG. 1, the device 100 may be described as being communicatively coupled to another device, such as a content source. In some examples, the term "communicatively coupled" may refer to a communication connection, which may be direct or indirect. The communication connection may, in some examples, represent a communication coupling between the device 100 and the other device. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. Two devices that are communicatively coupled may communicate with each other over one or more different types of networks (e.g., a wireless network and/or a wired network) in accordance with one or more communication protocols. In some examples, two devices that are communicatively coupled may associate with one another through an association process. In other examples, two devices that are communicatively coupled may communicate with each other without engaging in an association process. In some examples, a communication connection may enable the transmission and/or receipt of information. For example, a first device communicatively coupled to a second device may be configured to transmit information to the second device and/or receive information from the second device in accordance with the techniques of this disclosure. Similarly, the second device in this example may be configured to transmit information to the first device and/or receive information from the first device in accordance with the techniques of this disclosure. In some examples, the term "communicatively coupled" may refer to a temporary, intermittent, or permanent communication connection.

Any device described herein, such as the device 100, may be configured to operate in accordance with one or more communication protocols. For example, the device 100 may be configured to communicate with (e.g., receive information from and/or transmit information to) another device using one or more communication protocols. In such an example, the device 100 may be described as communicating with the other device over a connection. The connection may be compliant or otherwise be in accordance with a communication protocol.

As used herein, the term "communication protocol" may refer to any communication protocol, such as a communication protocol compliant with a communication standard or the like. As used herein, the term "communication standard" may include any communication standard, such as a wireless communication standard and/or a wired communication standard. A wireless communication standard may correspond to a wireless network. As an example, a communication standard may include any wireless communication standard corresponding to a wireless personal area network (WPAN) standard, such as Bluetooth (e.g., IEEE 802.15), Bluetooth low energy (BLE) (e.g., IEEE 802.15.4). As another example, a communication standard may include any wireless communication standard corresponding to a wireless local area network (WLAN) standard, such as WI-FI (e.g., any 802.11 standard, such as 802.11a, 802.11b, 802.11c, 802.11n, or 802.11ax). As another example, a communication standard may include any wireless communication standard corresponding to a wireless wide area network (WWAN) standard, such as 3G, 4G, 4G LTE, or 5G.

Compressed videos may suffer from some level of quality degradation due to information loss during lossy compression. The techniques described herein can be performed using, for example, a computing device (such as the device 100), a processing unit (such as the processing unit 120) and/or a video enhancement component of a device (such as the video enhancer 198). The techniques disclosed herein may enhance the quality of the videos by reducing the appearance of compression artifacts (e.g., noise) and/or adding texture to the video.

In some examples, video enhancement systems operate in a frame-by-frame manner, in which the system processes one frame at a time and, thus, disregards any temporal correlation between the frames. In some examples, video enhancement systems utilize batch processing in which a batch of frames are processed together (sometimes referred to as "multi-frame" enhancement techniques). Multi-frame enhancement techniques generally identify a batch of frames using a center frame along with one or more previous frames and one or more next frames. The batch of frames are then fed into a neural network and an enhanced frame associated with the center frame is generated. While the multi-frame enhancement techniques have advantages compared to the frame-by-frame techniques, the multi-frame enhancement techniques also include some drawbacks. For example, multi-frame enhancement techniques employ a lot of computation redundancy. To generate the current enhanced frame, a batch of frames is processed and to generate the next enhanced frame, another batch of frames is processed, while the first batch and the second batch of frames include all but one same frame. That is, in multi-frame enhancement techniques, all but one frame in a batch of frames is reprocessed at each step of the video enhancement. Another drawback with multi-frame enhancement techniques is that they have limited or no temporal memory. The temporal information to which the multi-frame enhancement technique has access to is limited to the size of the batch of frames. For example, if the frame batch size is five frames, then the temporal information of the multi-frame enhancement technique is limited to five frames.

Figure 2:
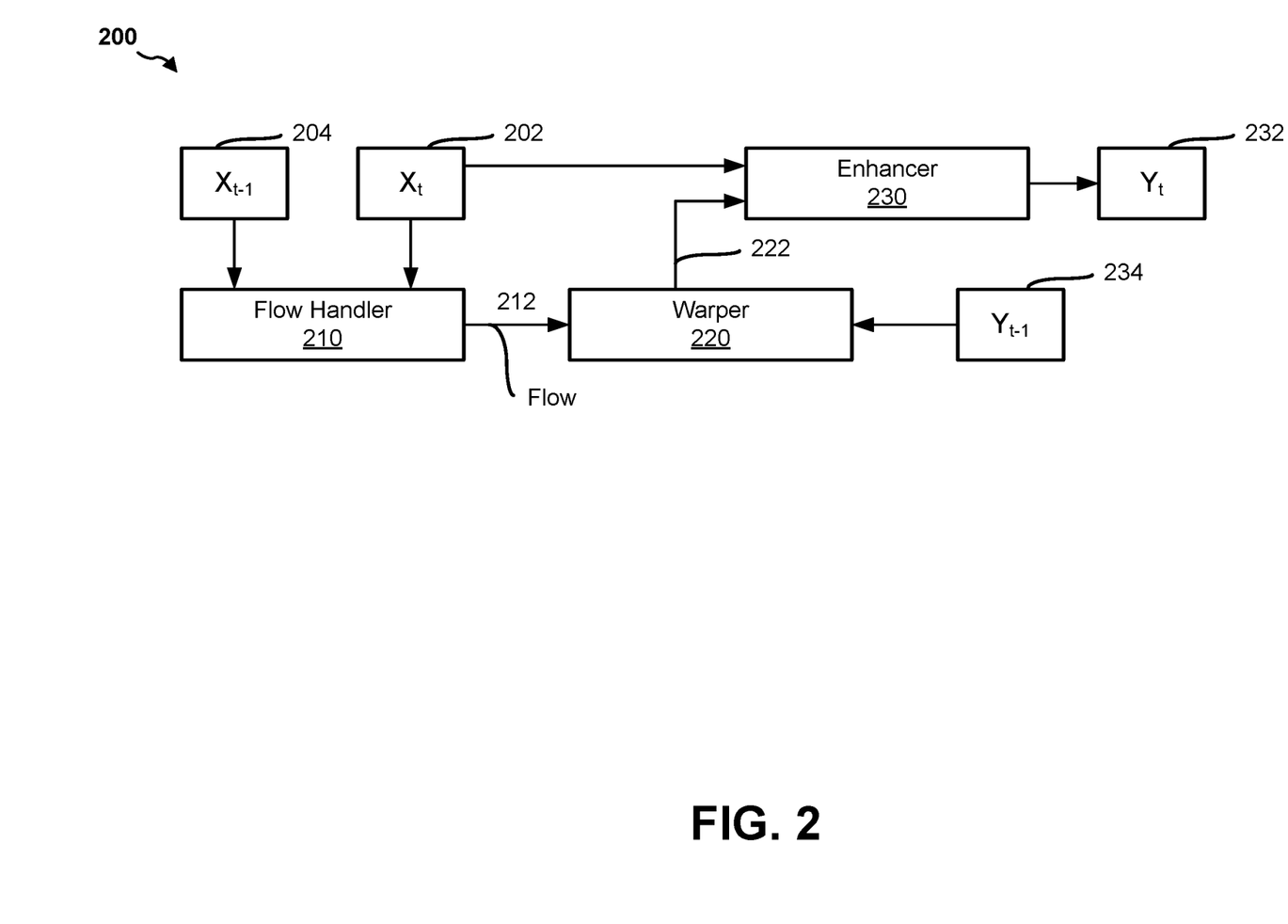
FIG. 2 is a conceptual flow diagram illustrating an example process of performing video enhancement, in accordance with the techniques of this disclosure.

FIG. 2 is a conceptual flow diagram illustrating an example process 200 of performing video enhancement. The example process 200 may employ machine learning based techniques after content is decoded (e.g., using the example content decoder 122 of FIG. 1). For example, the process 200 may include obtaining one or more decoded frames (which may suffer from quality degradation or "noise") from the content decoder and/or from memory, processing the decoded frames, and generating enhanced frames. Thus, the process 200 can operate independently of the content decoder and/or after a decoding process is performed on content.

The example process 200 may employ a recurrent structure to utilize the spatial information and temporal information in a video frame. As described herein, the convolutional layers may capture the spatial information within the video frames and the recurrent component extracts and maintains inter-frame information. For example, as described below, the process 200 may include (1) warping a previously enhanced frame to a current decoded frame, and (2) providing the current decoded frame and the warped previously enhanced frame to a convolutional neural network for enhancement and the generating of a current enhanced frame.

As shown in FIG. 2, the process 200 includes a flow handler 210, a warper 220, and an enhancer 230. The process 200 of FIG. 2 may include receiving a current decoded frame ($X_t$) 202 and a previously decoded frame ($X_{t-1}$) 204 from, for example, the content decoder 122 of FIG. 1 and/or from memory. The example process 200 of FIG. 2 outputs a current enhanced frame ($Y_t$) 232 based on (1) the current decoded frame ($X_t$) 202 and (2) a previously enhanced frame ($Y_{t-1}$) 234 that corresponds to the previously decoded frame ($X_{t-1}$) 204.

In the illustrated example of FIG. 2, the flow handler 210 (sometimes referred to as an "fnet") is a fully convolutional neural network that estimates a dense optical flow 212 between the current decoded frame ($X_t$) 202 and the previously decoded frame ($X_{t-1}$) 204. The flow handler 210 may be trained in an unsupervised manner. The parameters of the flow handler 210 may be trained based on a set of consecutive frames. During training, for two consecutive frames, the optical flow between the two frames may be estimated and the first frame may be warped using the estimated optical flow. The difference between the warped first frame and the second frame may be used as a loss to train the flow handler.

The flow handler 210 may compare two consecutive frames (e.g., the current decoded frame 202 and the previously decoded frame 204) and find any correspondence between the frames. As used herein, the correspondence between the frames corresponds to the optical flow 212. In some examples, the flow handler 210 may include an auto-encoder with downsampling/upsampling steps to capture pixel movement between the frames at different scales (e.g., how much pixels moved between the frames).

In some examples, the optical flow 212 includes a horizontal value and a vertical value corresponding to a pixel, representing how far the pixel moved horizontally and vertically between the previously decoded frame ($X_{t-1}$) 204 and the current decoded frame ($X_t$) 202. In some aspects, the optical flow 212 may include a horizontal value and a vertical value for a subset of the pixels of the previously decoded frame ($X_{t-1}$). In some aspects, the optical flow 212 may include a horizontal value and a vertical value for each pixel of the frame.

In some examples, consecutive frames in a video may not be aligned due to, for example, the scene dynamics, camera movements, etc. In the illustrated example of FIG. 2, the process 200 may utilize the warper 220 to facilitate state alignment. For example, the warper 220 may align the pixels of the previously enhanced frame ($Y_{t-1}$) 234 based on the optical flow 212 provided by the flow handler 210. The warper 220 may shift the pixels of the previously enhanced frame ($Y_{t-1}$) 234 in horizontal and/or vertical directions based on the optical flow 212 to generate a warped previously enhanced frame 222. For example, the warper 220 may apply the horizontal and vertical values of the optical flow 212 to the corresponding pixels in the previously enhanced frame ($Y_{t-1}$) to generate the warped previously enhanced frame 222.

As described above, the optical flow 212 identifies the movement of pixels between the previously decoded frame ($X_{t-1}$) 204 and the current decoded frame ($X_t$) 202. The previously enhanced frame ($Y_{t-1}$) 234 may be an enhanced version of the previously decoded frame ($X_{t-1}$) 204. By warping the previously enhanced frame ($Y_{t-1}$) 234 based on the optical flow 212, the generated warped previously enhanced frame 222 may represent an expected version of the current enhanced frame ($Y_t$) 232. The spatial and temporal information utilized in generating the previously enhanced frame ($Y_{t-1}$) 234 is thereby fed back into the process 200. As each enhanced frame may be generated based on a previous enhanced frame warped in the same way, the spatial and temporal information of the content being enhanced may continue to be fed back and influence enhancement, without applying multiple previous frames to the enhancement of each individual frame.

In the illustrated example of FIG. 2, the enhancer 230 (sometimes referred to as an "enet") is a fully convolutional neural network that generates the current enhanced frame ($Y_t$) 232. The parameters of the enhancer 230 may be trained using a dataset containing content which has been compressed and decompressed and the corresponding original content. In the illustrated example, the enhancer 230 receives the current decoded frame 202 and the warped previously enhanced frame 222 and generates the current enhanced frame 232 that corresponds to the current decoded frame 202, for example, by applying the trained parameters of the enhancer 230 to the current decoded frame 202 and the warped previously enhanced frame 222.

Lossy video compression methods may not only introduce artifacts to the video, but may also eliminate some high frequency content of the video that corresponds to fine textures. Thus, two different training strategies can be used to train the process 200 and, in particular, the flow handler 210 and the enhancer 230. Training may be performed using raw video and decoded/decompressed frames as reference frames. It should be appreciated that the training of the flow handler 210 and the enhancer 230 can be performed offline. Thus, the respective parameters for the flow handler 210 and the enhancer 230 may be determined during training and then the determined parameters may be applied to decoded (e.g., noisy) frames while the process 200 is operating online.

In some examples, the flow handler 210 and/or the enhancer 230 may be trained using pixel-level loss (e.g., L2) functions. Using pixel-level loss functions for training may facilitate the reducing of artifacts introduced via the lossy compression methods used to generate the compressed content In some examples, the flow handler 210 and/or the enhancer 230 may be trained using perceptual loss functions. Using perceptual loss functions (sometimes referred to as Generative Adversarial Networks (GAN)) may facilitate reducing the appearance of compression artifacts and recovery of texture.

It should be appreciated that the choice of loss function may depend on the type of application. For example, if smooth and artifact-free results are preferred, then employing pixel-level loss functions may be selected. However, if fine textures are preferred in the output frames, then employing perceptual loss functions may be selected.

It should be appreciated that the flow handler 210, the warper 220, and/or the enhancer 230 may be implemented using electronic hardware, computer software, or any combination thereof. Whether the flow handler 210, the warper 220, and/or the enhancer 230 are implemented as hardware or software may depend upon the particular application and design constraints imposed on the overall system.

Figure 3:
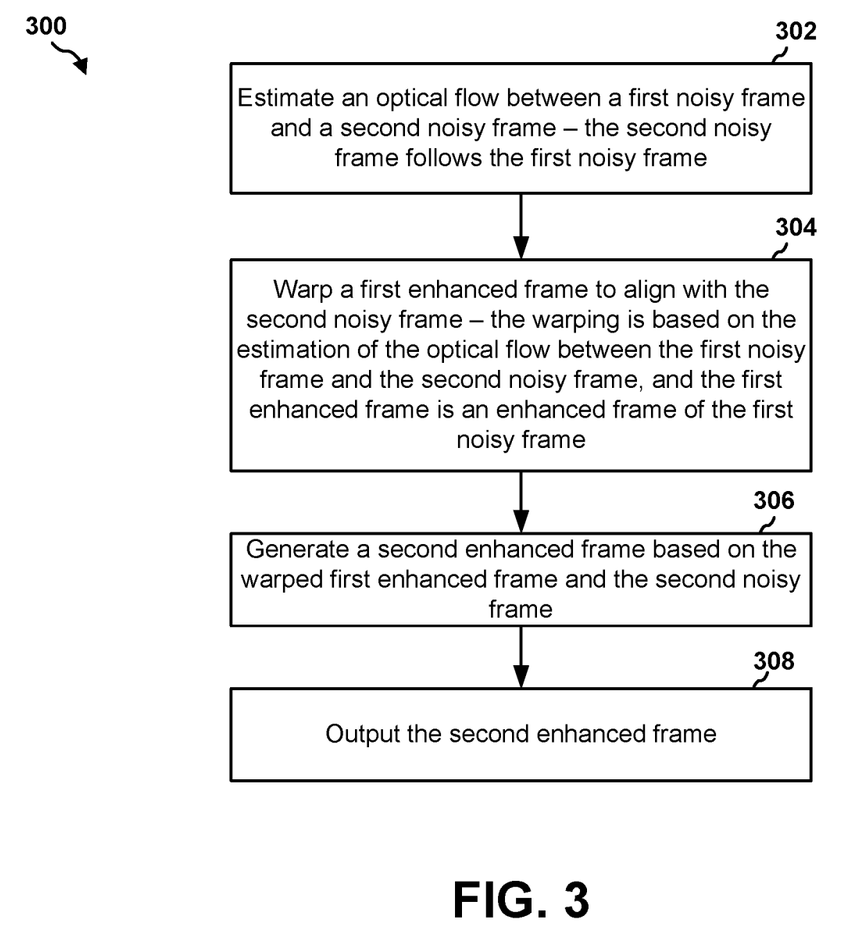
FIG. 3 illustrates an example flowchart of an example method in accordance with techniques of this disclosure.

FIG. 3 illustrates an example flowchart 300 of an example method in accordance with one or more techniques of this disclosure. The method may be performed by a processing unit or apparatus/device for video processing, such as the device 100 of FIG. 1, the processing unit 120 of FIG. 1, and/or the video enhancer 198 of FIG. 1. At 302, the apparatus may estimate an optical flow between a first noisy frame and a second noisy frame. For example, as described above, the process 200 operates on frames of content that were compressed and then decoded (e.g., by the content decoder 122 of FIG. 1). Compressing the content may introduce different artifacts in the frames and/or may remove texture in the frames. Referring to the process 200 of FIG. 2, the flow handler 210 may estimate the optical flow 212 between the current decoded frame ($X_t$) 202 and the previously decoded frame ($X_{t-1}$) 204. The optical flow 212 corresponds to the apparent motion of objects, surfaces, edges, etc. between the frames (e.g., the current decoded frame ($X_t$) 202 and the previously decoded frame ($X_{t-1}$) 204). In the illustrated example, the current decoded frame ($X_t$) 202 follows the previously decoded frame ($X_{t-1}$) 204. Although not shown, it should be appreciated that the process 200 may retrieve the previously decoded frame ($X_{t-1}$) 204 from a buffer (e.g., a frame buffer). The optical flow between the first noisy frame ($X_{t-1}$) and the second noisy frame ($X_t$) may identify a movement of a pixel from the first noisy frame ($X_{t-1}$) to the second noisy frame ($X_t$). In some aspects, the apparatus may decompress a compressed video to generate the first noisy frame ($X_{t-1}$) and the second noisy frame ($X_t$).

As described above, the flow handler 210 may include parameters that were determined based on offline processing of training data and loss functions. The flow handler 210 may then apply the parameters when estimating the optical flow 212 between the current decoded frame ($X_t$) 202 and the previously decoded frame ($X_{t-1}$) 204. In some aspects, the flow handler 210 may determine the parameters based on a set of consecutive training frames. The training frames may be frames of a video which is used for training the flow handler 210. The flow handler 210 may estimate an optical flow between a first training frame and a second training frame. The first training frame and the second training frame may be consecutive frames. The flow handler 210 may warp the first training frame based on the estimated optical flow, and utilize a difference between the warped first training frame and the second training frame as a loss to train the parameters.

At 304, the apparatus may warp a first enhanced frame to align with the second noisy frame. For example, the warper 220 of FIG. 2 may perform the warping based on (1) the estimation of the optical flow 212 (e.g., between the current decoded frame ($X_t$) 202 and the previously decoded frame 204 ($X_{t-1}$)) and (2) the previously enhanced frame ($Y_{t-1}$) 234 to generate a warped previously enhanced frame 222. Warping the first enhanced frame ($Y_{t-1}$) to align with the second noisy frame ($X_t$) may include applying the movement identified in the optical flow to the pixel in the first enhanced frame ($Y_{t-1}$). The first enhanced frame (e.g., the previously enhanced frame ($Y_{t-1}$) 234) may be an enhanced frame of the previously decoded frame ($X_{t-1}$) 204. It should be appreciated that the previously enhanced frame ($Y_{t-1}$) 234 is a frame that was enhanced by the process 200 during a previous iteration. It should be appreciated that the apparatus may include and/or may be in communication with a buffer (e.g. a frame buffer) that maintains the previously enhanced frame ($Y_{t-1}$) 234.

At 306, the apparatus may generate a second enhanced frame based on the warped first enhanced frame and the second noisy frame. For example, the enhancer 230 of FIG. 2 may generate the current enhanced frame ($Y_t$) 232 based on the current decoded frame ($X_t$) 202 and the warped previously enhanced frame 222. As described above, the enhancer 230 may include parameters that were determined based on offline processing of training data and loss functions. The enhancer 230 may then apply the parameters when generating the current enhanced frame ($Y_t$) 232 based on the current decoded frame ($X_t$) 202 and the warped previously enhanced frame 222. In some aspects, the enhancer 230 may determine the parameters during training based on a dataset comprising original training content and modified training content. The modified training content may be a compressed and decompressed version of the original training content. The apparatus may output the first enhanced frame ($Y_{t-1}$).

At 308, the apparatus may output the second enhanced frame. For example, the display 131 of FIG. 1 may output the current enhanced frame ($Y_t$) 232.

In certain examples, the process 200 (e.g., including the flow handler 210 and/or the enhancer 230) may be trained offline using pixel-level loss (L2) functions and/or perceptual loss (GAN) functions. Thus, respective parameters for the flow handler 210 and/or the enhancer 230 may be determined using reference data (e.g., by processing compressed video and comparing the output of the processed compressed video to raw (e.g., uncompressed) video).

It should be appreciated that the apparatus and/or the process 200 may operate on a compressed video. For example, the apparatus may receive a compressed video and then the content decoder 122 of FIG. 1 may decode frames of the compressed video. The apparatus may then process the decoded frames to facilitate enhancing the quality of the video. For example, the device 100, the processing unit 120 and/or the video enhancer 198 may utilize spatial information and temporal information for facilitating video quality enhancement. Accordingly, the techniques disclosed herein may be computationally efficient as they process one frame at a time (e.g., the previous frame is used for optical flow estimation and may be accessed via a frame buffer). Additionally, the feedback from the output may enable the techniques disclosed herein to have increased temporal memory about past frames compared to multi-frame approaches that have no temporal memory and/or limited temporal memory. For example, the process 200 may align the previously enhanced frame ($Y_{t-1}$) 234 based on the optical flow 212 associated with the current decoded frame ($X_t$) 202 to enhance the current decoded frame ($X_t$) 202. The feedback also may enable an output frame sequence with improved consistency. For example, the enhancements applied to the previous frame may be used while processing the current frame. The reuse of information reduces the likelihood of flicker in the enhanced video.

In some examples, a system according to the present disclosure, such as the example system 100, includes means for estimating an optical flow between a first noisy frame ($X_{t-1}$) and a second noisy frame ($X_t$), the second noisy frame ($X_t$) following the first noisy frame ($X_{t-1}$), means for warping a first enhanced frame ($Y_{t-1}$) to align with the second noisy frame ($X_t$), the means for warping being based on the estimation of the optical flow between the first noisy frame ($X_{t-1}$) and the second noisy frame ($X_t$), the first enhanced frame ($Y_{t-1}$) being an enhanced frame of the first noisy frame ($X_{t-1}$), means for generating a second enhanced frame ($Y_t$) based on the warped first enhanced frame ($Y_{t-1}$) and the second noisy frame ($X_t$), and means for outputting the second enhanced frame ($Y_t$). The means may be a CPU, a GPU, a DSP, a neural signal processor (NSP). For example, in the example device 100 of FIG. 1, the processing unit 120 or the video enhancer 198 may be the means for estimating an optical flow between a first noisy frame ($X_{t-1}$) and a second noisy frame ($X_t$), the second noisy frame ($X_t$) following the first noisy frame ($X_{t-1}$), means for warping a first enhanced frame ($Y_{t-1}$) to align with the second noisy frame ($X_t$), the means for warping being based on the estimation of the optical flow between the first noisy frame ($X_{t-1}$) and the second noisy frame ($X_t$), the first enhanced frame ($Y_{t-1}$) being an enhanced frame of the first noisy frame ($X_{t-1}$), means for generating a second enhanced frame ($Y_t$) based on the warped first enhanced frame ($Y_{t-1}$) and the second noisy frame ($X_t$), and means for outputting the second enhanced frame ($Y_t$).

The system may further include means for estimating an optical flow between a third noisy frame ($X_{t-2}$) and the first noisy frame ($X_{t-1}$), the third noisy frame ($X_{t-2}$) preceding the first noisy frame ($X_{t-1}$), means for warping a third enhanced frame ($Y_{t-2}$) to align with the first noisy frame ($X_{t-1}$), the warping being based on the estimation of the optical flow between the third noisy frame ($X_{t-2}$) and the first noisy frame ($X_{t-1}$), the third enhanced frame ($Y_{t-2}$) being an enhanced frame of the third noisy frame ($X_{t-2}$), and means for generating the first enhanced frame ($Y_{t-1}$) based on the warped third enhanced frame ($Y_{t-2}$) and the first noisy frame ($X_{t-1}$). The means may be a CPU, a GPU, a DSP, a NSP. For example, in the example device 100 of FIG. 1, the processing unit 120 or the video enhancer 198 may be the means for estimating an optical flow between a third noisy frame ($X_{t-2}$) and the first noisy frame ($X_{t-1}$), the third noisy frame ($X_{t-2}$) preceding the first noisy frame ($X_{t-1}$), means for warping a third enhanced frame ($Y_{t-2}$) to align with the first noisy frame ($X_{t-1}$), the warping being based on the estimation of the optical flow between the third noisy frame ($X_{t-2}$) and the first noisy frame ($X_{t-1}$), the third enhanced frame ($Y_{t-2}$) being an enhanced frame of the third noisy frame ($X_{t-2}$), and means for generating the first enhanced frame ($Y_{t-1}$) based on the warped third enhanced frame ($Y_{t-2}$) and the first noisy frame ($X_{t-1}$).

The system may further include means for outputting the first enhanced frame ($Y_{t-1}$). For example, in the example device 100 of FIG. 1, the processing unit 120, the video enhancer 198, the communication interface 126, or a combination thereof may be the means for outputting the first enhanced frame ($Y_{t-1}$). The system may further include means for decompressing a compressed video to generate the first noisy frame ($X_{t-1}$) and the second noisy frame ($X_t$). For example, in the example device 100 of FIG. 1, the content decoder 122 may be the means for decompressing a compressed video to generate the first noisy frame ($X_{t-1}$) and the second noisy frame ($X_t$).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of video processing, comprising:
   estimating an optical flow between a first noisy frame $(X_{t-1})$ and a second noisy frame $(X_t)$, the second noisy frame $(X_t)$ following the first noisy frame $(X_{t-1})$;
   warping a first enhanced frame $(Y_{t-1})$ to align with the second noisy frame $(X_t)$, the warping being based on the estimation of the optical flow between the first noisy frame $(X_{t-1})$ and the second noisy frame $(X_t)$, the first enhanced frame $(Y_{t-1})$ being an enhanced frame of the first noisy frame $(X_{t-1})$;
   generating a second enhanced frame $(Y_t)$ based on the warped first enhanced frame $(Y_{t-1})$ and the second noisy frame $(X_t)$; and
   outputting the second enhanced frame $(Y_t)$.

2. The method of claim 1, further comprising:
   estimating an optical flow between a third noisy frame $(X_{t-2})$ and the first noisy frame $(X_{t-1})$, the third noisy frame $(X_{t-2})$ preceding the first noisy frame $(X_{t-1})$;
   warping a third enhanced frame $(Y_{t-2})$ to align with the first noisy frame $(X_{t-1})$, the warping being based on the estimation of the optical flow between the third noisy frame $(X_{t-2})$ and the first noisy frame $(X_{t-1})$, the third enhanced frame $(Y_{t-2})$ being an enhanced frame of the third noisy frame $(X_{t-2})$; and
   generating the first enhanced frame $(Y_{t-1})$ based on the warped third enhanced frame $(Y_{t-2})$ and the first noisy frame $(X_{t-1})$.

3. The method of claim 2, further comprising outputting the first enhanced frame $(Y_{t-1})$ before outputting the second enhanced frame $(Y_t)$.

4. The method of claim 1, wherein the first noisy frame $(X_{t-1})$ and the second noisy frame $(X_t)$ are decoded frames of a compressed video.

5. The method of claim 1, further comprising decompressing a compressed video to generate the first noisy frame $(X_{t-1})$ and the second noisy frame $(X_t)$.

6. The method of claim 1, wherein the estimating of the optical flow is based on parameters determined during training.

7. The method of claim 6, wherein determining the parameters during training comprises estimating an optical flow between a first training frame and a second training frame, the first training frame and the second training frame being consecutive frames, warping the first training frame based on the estimated optical flow, and utilizing a difference between the warped first training frame and the second training frame as a loss to train the parameters.

8. The method of claim 1, wherein the generating of the second enhanced frame is based on parameters determined during training.

9. The method of claim 8, wherein the parameters are determined during training based on a dataset comprising original training content and modified training content, the modified training content being a compressed and decompressed version of the original training content.

10. The method of claim 1, wherein the optical flow between the first noisy frame $(X_{t-1})$ and the second noisy frame $(X_t)$ identifies a movement of a pixel from the first noisy frame $(X_{t-1})$ to the second noisy frame $(X_t)$.

11. The method of claim 10, wherein warping the first enhanced frame $(Y_{t-1})$ to align with the second noisy frame $(X_t)$ is applying the movement identified in the optical flow to the pixel in the first enhanced frame $(Y_{t-1})$.

12. An apparatus for video processing, comprising:
    a memory; and
    at least one processor coupled to the memory and configured to:
      estimate an optical flow between a first noisy frame $(X_{t-1})$ and a second noisy frame $(X_t)$, the second noisy frame $(X_t)$ following the first noisy frame $(X_{t-1})$;
      warp a first enhanced frame $(Y_{t-1})$ to align with the second noisy frame $(X_t)$, the warping being based on the estimation of the optical flow between the first noisy frame $(X_{t-1})$ and the second noisy frame $(X_t)$, the first enhanced frame $(Y_{t-1})$ being an enhanced frame of the first noisy frame $(X_{t-1})$;
      generate a second enhanced frame $(Y_t)$ based on the warped first enhanced frame $(Y_{t-1})$ and the second noisy frame $(X_t)$; and
      output the second enhanced frame $(Y_t)$.

13. The apparatus of claim 12, wherein the at least one processor is further configured to:
    estimate an optical flow between a third noisy frame $(X_{t-2})$ and the first noisy frame $(X_{t-1})$, the third noisy frame $(X_{t-2})$ preceding the first noisy frame $(X_{t-1})$;
    warp a third enhanced frame $(Y_{t-2})$ to align with the first noisy frame $(X_{t-1})$, the warping being based on the estimation of the optical flow between the third noisy frame $(X_{t-2})$ and the first noisy frame $(X_{t-1})$, the third enhanced frame $(Y_{t-2})$ being an enhanced frame of the third noisy frame $(X_{t-2})$; and
    generate the first enhanced frame $(Y_{t-1})$ based on the warped third enhanced frame $(Y_{t-2})$ and the first noisy frame $(X_{t-1})$.

14. The apparatus of claim 13, further comprising outputting the first enhanced frame $(Y_{t-1})$.

15. The apparatus of claim 12, wherein the first noisy frame $(X_{t-1})$ and the second noisy frame $(X_t)$ are decoded frames of a compressed video.

16. The apparatus of claim 12, further comprising decompressing a compressed video to generate the first noisy frame $(X_{t-1})$ and the second noisy frame $(X_t)$.

17. The apparatus of claim 12, wherein the at least one processor is further configured to estimate the optical flow based on parameters determined during training.

18. The apparatus of claim 17, wherein determining the parameters during training comprises estimating an optical flow between a first training frame and a second training frame, the first training frame and the second training frame being consecutive frames, warping the first training frame based on the estimated optical flow, and utilizing a difference between the warped first training frame and the second training frame as a loss to train the parameters.

19. The apparatus of claim 12, wherein the at least one processor is further configured to generate the second enhanced frame based on parameters determined during training.

20. The apparatus of claim 19, wherein the parameters are determined during training based on a dataset comprising original training content and modified training content, the modified training content being a compressed and decompressed version of the original training content.

21. The apparatus of claim 12, wherein the optical flow between the first noisy frame ($X_{t-1}$) and the second noisy frame ($X_t$) identifies a movement of a pixel from the first noisy frame ($X_{t-1}$) to the second noisy frame ($X_t$).

22. The apparatus of claim 21, wherein warping the first enhanced frame ($Y_{t-1}$) to align with the second noisy frame ($X_t$) is applying the movement identified in the optical flow to the pixel in the first enhanced frame ($Y_{t-1}$).

23. A computer-readable medium storing computer executable code for video processing, comprising code to:
estimate an optical flow between a first noisy frame ($X_{t-1}$) and a second noisy frame ($X_t$), the second noisy frame ($X_t$) following the first noisy frame ($X_{t-1}$);
warp a first enhanced frame ($Y_{t-1}$) to align with the second noisy frame ($X_t$), the warping being based on the estimation of the optical flow between the first noisy frame ($X_{t-1}$) and the second noisy frame ($X_t$), the first enhanced frame ($Y_{t-1}$) being an enhanced frame of the first noisy frame ($X_{t-1}$);
generate a second enhanced frame ($Y_t$) based on the warped first enhanced frame ($Y_{t-1}$) and the second noisy frame ($X_t$); and
output the second enhanced frame ($Y_t$).

24. The computer-readable medium of claim 23, further comprising code to:
estimate an optical flow between a third noisy frame ($X_{t-2}$) and the first noisy frame ($X_{t-1}$), the third noisy frame ($X_{t-2}$) preceding the first noisy frame ($X_{t-1}$);
warp a third enhanced frame ($Y_{t-2}$) to align with the first noisy frame ($X_{t-1}$), the warping being based on the estimation of the optical flow between the third noisy frame ($X_{t-2}$) and the first noisy frame ($X_{t-1}$), the third enhanced frame ($Y_{t-2}$) being an enhanced frame of the third noisy frame ($X_{t-2}$); and
generate the first enhanced frame ($Y_{t-1}$) based on the warped third enhanced frame ($Y_{t-2}$) and the first noisy frame ($X_{t-1}$).

25. The computer-readable medium of claim 23, wherein the first noisy frame ($X_{t-1}$) and the second noisy frame ($X_t$) are decoded frames of a compressed video.

26. The computer-readable medium of claim 23, further comprising code to decompress a compressed video to generate the first noisy frame ($X_{t-1}$) and the second noisy frame ($X_t$).

27. The computer-readable medium of claim 23, wherein the estimating of the optical flow is based on parameters determined during training, and wherein determining the parameters during training comprises estimating an optical flow between a first training frame and a second training frame, the first training frame and the second training frame being consecutive frames, warping the first training frame based on the estimated optical flow, and utilizing a difference between the warped first training frame and the second training frame as a loss to train the parameters.

28. The computer-readable medium of claim 23, wherein the generating of the second enhanced frame is based on parameters determined during training, and wherein the parameters are determined during training based on a dataset comprising original training content and modified training content, the modified training content being a compressed and decompressed version of the original training content.

29. The computer-readable medium of claim 23, wherein the optical flow between the first noisy frame ($X_{t-1}$) and the second noisy frame ($X_t$) identifies a movement of a pixel from the first noisy frame ($X_{t-1}$) to the second noisy frame ($X_t$).

30. The computer-readable medium of claim 29, wherein warping the first enhanced frame ($Y_{t-1}$) to align with the second noisy frame ($X_t$) is applying the movement identified in the optical flow to the pixel in the first enhanced frame ($Y_{t-1}$).

* * * * *